(12) United States Patent
Kärki et al.

(10) Patent No.: US 6,664,340 B1
(45) Date of Patent: Dec. 16, 2003

(54) SULPHONATED POLYMER RESIN AND PREPARATION THEREOF

(75) Inventors: Ari Kärki, Kotka (FI); Erkki Paatero, Kauniainen (FI); Heikki Heikkilä, Espoo (FI); Heikki Mononen, Kyminlinna (FI); Hannu Paananen, Kantvik (FI); Jari Tiihonen, Lappeenranta (FI)

(73) Assignee: Danisco Finland Oy, Espoo (FI)

( * ) Notice: Subject to any disclaimer, the term of this patent is extended or adjusted under 35 U.S.C. 154(b) by 0 days.

(21) Appl. No.: 10/069,300

(22) PCT Filed: Apr. 20, 2000

(86) PCT No.: PCT/FI00/00350

§ 371 (c)(1),
(2), (4) Date: May 28, 2002

(87) PCT Pub. No.: WO00/64951

PCT Pub. Date: Nov. 2, 2000

(30) Foreign Application Priority Data

Apr. 23, 1999 (FI) .................................................. 990923

(51) Int. Cl.[7] .................................................. C08F 8/34
(52) U.S. Cl. ..................... 525/333.5; 525/344
(58) Field of Search ............................... 525/333.5, 344

(56) References Cited

U.S. PATENT DOCUMENTS

| 2,945,842 | A | 7/1960 | Eichorn et al. |
| 3,252,921 | A | 5/1966 | Hansen et al. |
| 4,113,666 | A | 9/1978 | Sano et al. |
| 4,220,739 | A | 9/1980 | Walles |

FOREIGN PATENT DOCUMENTS

| DE | 26 27 877 | 1/1978 |
| EP | 0 361 685 A1 | 4/1990 |
| FI | 894189 | 9/1989 |
| FR | 1.280.353 | 11/1961 |
| GB | 2 203 438 A | 10/1988 |
| SE | 7410048-8 | 9/1975 |
| WO | WO 97/11989 | 4/1997 |

OTHER PUBLICATIONS

K.W. Pepper, "Sulphonated Cross–linked Polystyrene: A Monofunctional Cation–Exchange Resin", J. appl. Chem., I, Mar., 1951, pp. 124–132.

*Primary Examiner*—Bernard Lipman
(74) *Attorney, Agent, or Firm*—Scully, Scott, Murphy & Presser (57) ABSTRACT

The invention relates to sulphonated polymer resins, particularly polymer resins with a sulphonated shell layer, and the preparation thereof. Resins according to the invention are prepared by sulphonating a polymer in a non-swollen state with substantially pure gaseous sulphur trioxide substantially in the shell layer of the polymer particles. The polymer to be sulphonated can be for example a styrene-DVB copolymer. The resins according to the invention can be used for example as chromatographic resins, ion-exchange resins and catalyst resins.

60 Claims, 4 Drawing Sheets

SULPHONATED POLYMER RESIN AND PREPARATION THEREOF

BACKGROUND OF THE INVENTION

The invention relates to sulphonated polymer resins, particularly ion-exchange resins, and the preparation of such resins. The invention relates especially to polymer resins whose shell layer is sulphonated, and to the preparation thereof. The polymer material to be sulphonated is typically for example a cross-linked styrene-divinylbenzene copolymer (a styrene copolymer cross-linked with divinylbenzene). The obtained sulphonated polymer resins are useful for example as chromatographic resins, ion-exchange resins and catalyst resins, either in a spherical or pulverized form.

Polystyrene-based resins are conventionally sulphonated for example by concentrated sulphuric acid in a swelling agent (usually a chlorohydrocarbon). However, the use of chlorohydrocarbons has been reduced for example due to environmental reasons. Polystyrene-based resins have also been sulphonated directly by a gaseous sulphur trioxide. It has been noted, however, that the obtained products where polymer particles are fully sulphonated are not physically stable but they tend to break.

European Published Application 0,361,685 (Rohm & Haas Co.) describes partly functionalized, for example sulphonated, polymer resin particles and a process for producing them. The process provides polymer resin particles where 68 to 98% of the accessible functionalizable sites are functionalized (e.g. sulphonated). The unfunctionalized sites are situated in the inner core of the particles, whereas the functionalized groups are located in the shell layer of the particles. The depth of functionalization can be for example 0.32 to 0.75 times the average radius of the polymer particles. In this publication the sulphonation is carried out with concentrated sulphuric acid at a normal pressure at a high temperature, such as 120 to 140° C.

U.S. Pat. No. 3,252,921 (Dow Chemical Company) describes partial/heterogeneous sulphonation of alkenylaromatic polymer resins by first using a swelling agent (a chlorohydrocarbon) and by thereafter carrying out the actual sulphonation with chlorosulphonic acid or liquid sulphur trioxide. This provides polymer particles with a sulphonated shell layer.

Example 3 of German Offenlegungsschrift 2,627,877 (Sumitomo Chemical Co.) describes sulphonation of fibrous polyethylene with gaseous sulphur trioxide in a vacuum. According to claim 4, the process is carried out at a low temperature (10 to 90° C.). The degree of sulphonation may vary within a broad range, such as 0.01 to 10 meq/g. The sulphonation reagent is said to have a concentration preferably in a range of from 10 to 80% by volume of $SO_3$. If the $SO_3$ content of the sulphonation gas is higher, the sulphonation reaction does not proceed in a uniform manner.

French Patent 1,280,353 (Rohm & Haas Co.) describes the sulphonation of macroporous vinylaromatic polymers with gaseous sulphur trioxide (usually in a mixture with air) at a normal pressure. According to the examples, the temperature varies from 60 to 100° C. The publication does not disclose the preparation of partly sulphonated products.

Definitions

The extent to which resins are sulphonated is indicated by their degree of sulphonation, which is usually given in dry weight capacity. The theoretical dry weight capacity (one sulphone group per benzene ring) of a monosulphonated styrene-divinylbenzene copolymer resin varies between 4.8 and 5.4 meq/g.

One of the essential properties of ion-exchange resins is their capacity. The capacity of a sulphonated styrene-divinylbenzene copolymer resin indicates how many $H^+$ ions it can exchange per one mass and/or volumetric unit of resin. The capacity can be given as dry weight capacity or volume capacity. The dry weight capacity is indicated as milliequivalents per one gram of dry resin (meq/g) and the volume capacity is indicated as equivalents per one litre of fully swollen resin (eq/l).

When a resin is transferred from one medium to another, it may either swell or shrink. Great changes in the volume hinder the use of the resin in columns, wherefore the variation in volume should be minimal.

Resin particle size and the distribution thereof essentially affect the behaviour of an ion-exchange resin, such as kinetics of mass transfer, pressure drop over a backed bed, flow channelling and the degree of packing of the bed. The mean particle size of resin or the mean sphere size (resin particles are usually spherical) refers to an average based on the volume or mass proportion of different size fractions. The sharpness of the sphere size distribution is generally described by means of a uniformity coefficient (UC). This coefficient is calculated by forming a quotient between a mesh size that retains 40% of resin particles and a mesh size retaining 90% of resin particles. This ratio is given value 1 when all the particles are of equal size. For example, a typical resin intended for water treatment has a uniformity coefficient UC=1.7. The UC of industrial chromatographic separation resins varies between 1.05 and 1.25.

The degree of cross-linking of the sulphonated styrene-divinylbenzene copolymer resin is dependent on the amount of the divinylbenzene used as a cross-linking agent during the polymerization. A gel-type resin normally comprises 1 to 12% of divinylbenzene. The degree of cross-linking affects for example the mechanical strength, ion exchange capacity, water retention capacity, swelling, selectivity and chemical stability of the ion exchanger. Resins with a low degree of cross-linking are soft and mechanically unstable, whereas a high degree of cross-linking provides hardness, fragility and increased sensitivity to osmotic effects.

There are two main types of ion-exchange resins (e.g. sulphonated styrene-divinylbenzene copolymer resins): gel-type and macroporous resins. A macroporous ion-exchange resin is a resin where additional blowing agent has been added to the monomer mixture during polymerization and removed thereafter. This provides a structure with far greater pores than in the polymer network. A gel-type ion-exchange resin, in turn, refers to a resin where the porosity is only based on the porosity of the cross-linked polymer network.

Mechanical strength describes the resin's ability to resist wearing. In a physically advantageous ion-exchange resin the particles are spherical in shape, and the resin does not comprise cracks and is not fragile. Mechanical strength is examined for example by a cyclic test of watering and drying, where the resin strength is examined by subjecting the resin to repeated watering and drying operations. Physical hardness is measured by means of compression resistance. The resistance of a resin to osmotic forces is important in industrial applications. Several methods have been introduced to measure the resistance of a resin to osmotic shock.

Chemical stability of a resin refers to the resistance of active groups and the hydrocarbon backbone particularly to oxidation.

The primary factor restricting the use of a strongly acidic cation-exchange resin at high temperatures is desulphonation. A typical maximum operating temperature of such resins in long-term use is 120° C.

In the present invention the sulphonation of the shell layer means that the polymer particles are not fully sulphonated but the sulphonation is only effected beginning from the surface of the particles so that the core remains unsulphonated. There is a clearly defined interface between the sulphonated and unsulphonated regions. The sulphonation depth can vary.

Sulphonation with 'substantially pure gaseous sulphur trioxide' means in the present invention that the space where the sulphonation is carried out is substantially free of diluting gas components, such as air.

BRIEF DESCRIPTION OF THE INVENTION

The object of the invention is to provide a process for preparing a sulphonated stable polymer resin so that the sulphonation can be carried out without a swelling agent, such as a chlorohydrocarbon. This problem has been solved in the invention such that the sulphonation of a polymer resin in a non-swollen state is performed by substantially pure gaseous sulphur trioxide. Sulphonation is substantially performed on the shell layer of polymer particles.

The objects of the invention are achieved by means of a product and a process which are characterized by what is disclosed in independent claims 1 and 21. The preferred embodiments of the invention are disclosed in the dependent claims.

The invention also relates to the use of the obtained sulphonated resin as a chromatographic resin, ion-exchange resin and catalyst resin.

DETAILED DESCRIPTION OF THE INVENTION

The invention relates to a sulphonated polymer resin, which is characterized in that it is prepared by sulphonating a non-swollen polymer with substantially pure gaseous sulphur trioxide substantially in the shell layer of the polymer particles.

The invention also relates to a process for preparing a sulphonated polymer resin. The process is characterized by sulphonating a polymer in a non-swollen state with substantially pure gaseous sulphur trioxide substantially in the shell layer of the polymer particles.

The polymer used as a starting material is sulphonated substantially in the shell layer of the polymer particles. The sulphonation depth and the degree of sulphonation indicating the depth can vary. The thickness of the sulphonated shell layer can vary for example between 1 and 80%, preferably 10 and 50%, calculated from the average radius of a polymer particle.

In a preferred embodiment the interface between the sulphonated and the unsulphonated regions is clearly defined in the polymer resin particles according to the invention whose shell layer is sulphonated.

A polymer is preferably sulphonated at a reduced pressure, and the reaction space containing the polymer is subjected to a reduced pressure already before the sulphonation in order to remove diluting gas components, such as air. The pressure produced in the reaction space is typically lower than 10000 Pa, preferably less than 1000 Pa, and most preferably between 50 and 100 Pa.

The polymer used as a starting material is typically other than polyethylene. The polymer is typically an alkenylaromatic polymer, which is preferably cross-linked. Typical alkenylaromatic polymers include vinylaromatic polymers. Examples of vinyl aromatic- monomers are styrene, methylstyrene, ethylstyrene, etc. and other styrenic derivatives.

An advantageous polymer is a polymer with a styrene skeleton. A particularly advantageous polymer is a styrene-divinylbenzene copolymer, which is a cross-linked copolymer.

Other monomers can also be used as admixed components in the copolymer to be sulphonated. Such monomers include different acrylate esters and acrylic acids. Examples include methyl acrylate, ethyl acrylate, methyl methacrylate, acrylic acid, methacrylic acid and acrylonitrile, and other organic compounds with one double bond.

In addition to divinylbenzene (DVB), other possible cross-linking monomers include different known alkenylaromatic and aliphatic cross-linking agents, such as isoprene, allyl methacrylate, vinyl methacrylate, glycol dimethacrylate, glycol diacrylate and other polyunsaturated organic compounds.

The polymer to be sulphonated is preferably a gel-type polymer with a cross-linking degree of typically between 0.5 and 12%, preferably 1 and 10% of the cross-linking component, such as DVB. The polymer to be sulphonated can also be a macroporous polymer, in which case the degree of cross-linking typically varies between 4 and 30%, preferably between 8 and 20% of the cross-linking component, such as DVB.

The polymer is preferably a styrene-divinylbenzene copolymer, which can be either gel-type or macroporous. The cross-linking degree of the gel-type styrene-divinylbenzene is typically between 0.5 and 12% DVB, preferably 1 and 10% DVB. The cross-linking degree of the macroporous styrene-divinylbenzene is typically between 4 and 30% DVB, preferably between 8 and 20% DVB.

Sulphonation is carried out at a low temperature, typically from 20 to 120° C., and preferably 40 to 80° C.

The polymer is typically sulphonated to a sulphonation degree of 0.1 to 5.5 meq/g, preferably 0.2 to 5.5 meq/g, more preferably 0.2 to 4.2 meq/g, and most preferably 1 to 3 meq/g.

In order to obtain particles with a homogenous sulphonation degree, the particle size distribution of the polymer should preferably be as narrow as possible. The particle size distribution, given in UC units, is typically on a range of from 1 to 1.7, preferably 1 to 1.25.

The resins prepared according to the invention are typically ion-exchange resins and particularly strongly acidic cation-exchange resins.

The polymer resin according to the invention is typically sulphonated in a particle form, preferably in a spherical form. The polymer resin can also be in a fibrous form, i.e. it can consist of either staple and/or long fibres. The resin can also be in a pulverized form. Resins with a sulphonated shell layer are preferably used in a spherical form, but they can also be used in a pulverized form.

The process according to the invention employs substantially pure gaseous sulphur trioxide as the sulphonating agent. The source of sulphur trioxide can be for example pure sulphur trioxide per se. It can also be sulphur dioxide, which is oxidized in situ into sulphur trioxide. Sulphur trioxide can also be obtained from oleum (fuming sulphuric acid which contains sulphur trioxide), in which case the sulphonation is typically carried out at the vapour pressure of sulphur trioxide or at a lower pressure.

An embodiment of the invention can be implemented for example by first subjecting a reaction space, which contains the polymer used as a starting material, to a reduced pressure (e.g. about 100 Pa) in order to remove diluting gases, such as air. Substantially pure sulphur trioxide is thereafter fed into a reaction vessel containing the polymer, whereafter the sulphonation takes place at the vapour pressure of sulphur trioxide or at a lower pressure. The reaction time of the sulphonation is typically selected between 1 and 24 hours.

The sulphonation reaction is adjusted by means of the amount of sulphur trioxide used, the reaction temperature and the reaction time. The sulphonation reaction is terminated for example by dilution with air.

The sulphonation reaction proceeds according to a shrinking core mechanism, which means that the interface between the sulphonated and the unsulphonated regions is very distinct.

After the sulphonation reaction the sulphonated product is subjected to after-treatment to prevent breakage of the resin structure for example by first diluting the reaction product with sulphuric acid (50%) and thereafter washing it with water to a pH value of 5. The reaction product can also be diluted directly into water.

The process enables the preparation of a partly sulphonated product, where only the shell layer of the polymer particles has been sulphonated. Such partly sulphonated particles (less than one sulphone group per benzene ring) do not break when the sulphonated product is being diluted during the after-treatment phase. Due to their stability, resins whose shell layer has been sulphonated are useful for purposes which require resins in a spherical form. Resin particles are also useful in the production of pulverized resins.

A gel-type polymer resin prepared according to the invention has the following advantageous properties compared with a conventional resin sulphonated with sulphuric acid: it swells less than a conventional gel resin having the same cross-linking degree, it has better stability against oxidizing conditions, and corresponding thermal stability, and it has better resistance to osmotic shock, better compression resistance and a higher degree of packing. Partly sulphonated polymer resin particles prepared according to the invention do not break when the resin is being used and processed.

Macroporous resins prepared according to the invention, on the other hand, have been found to have better activity for example as catalyst resins than conventional resins sulphonated with sulphuric acid.

The invention will be described below by means of detailed working examples. Examples 1 to 3 describe the preparation of a gel-type resin, Examples 4 to 11 describe properties of the resin compared with conventional resins, Examples 12 to 14 illustrate applications of use of the resin, and Example 15 describes the preparation and use of a macroporous resin. The abbreviation 'DVB' used in the examples denotes divinylbenzene.

EXAMPLE 1

Preparation of Gel-type Styrene-DVB Copolymers with a Sulphonated Shell Layer at Different Temperatures and with Different Particle Sizes The starting material in the sulphonation was a gel-type styrene-DVB copolymer with a cross-linking degree of 5.5% DVB, prepared by a suspension polymerization technique. For the purpose of tests, two fractions with sphere sizes of 250 to 280 $\mu$m and 120 to 140 $\mu$m, respectively, were sieved out from the copolymer batch.

The sulphonation reagent was gaseous sulphur trioxide, which was derived from oleum (sulphur trioxide content 65%). No swelling agent was used. The sulphonation was carried out at 20, 40 and 60° C. and the sulphonation times varied between 0.5 and 24 hours.

The sulphonation apparatus consisted of a reactor comprising two interconnected glass vessels with a valve between them. A desired amount of polymer was weighed into the greater glass vessel of 1.25 l and subjected to a reduced pressure for 30 min to obtain a pressure of 50 Pa. Oleum was added to the other glass vessel of 0.8 l. The temperature in the reactor was adjusted to a desired value of 20° C. and the pressure in the vessel containing the oleum was adjusted to 8000 Pa by a vacuum pump. The ratio of oleum to the polymer was 50 ml of oleum to 10 g of polymer.

After a suitable reduced pressure had been reached (the pressure in the reaction space was 50 Pa and the pressure of the space containing the oleum was 8000 Pa), the reactor was adjusted to a desired reaction temperature (20, 40 or 60° C.) and the polymer was sulphonated for a desired time (0.5 to 24 hr) by opening the valve between the reaction vessels. The sulphonation was carried out as a batch-type reaction without mixing.

The sulphonation reaction was terminated by flushing the reaction space with air. In order to prevent the resin structure from breaking, the obtained products were usually diluted by a sulphuric acid series of 98, 60, 40, 30, 20 and 10% $H_2SO_4$ and washed with fully deionized water until the pH of the solution exceeded 5. Some of the products were diluted directly into water.

The dry weight capacity and volume capacity of the prepared cation-exchange resins were determined, and the progression of the sulphonation as a distinct shell layer was detected by measuring sulphur profiles from crosscuts of resin spheres by an X-ray fluorescence analyzer connected to an electron microscope.

Figure 1A:
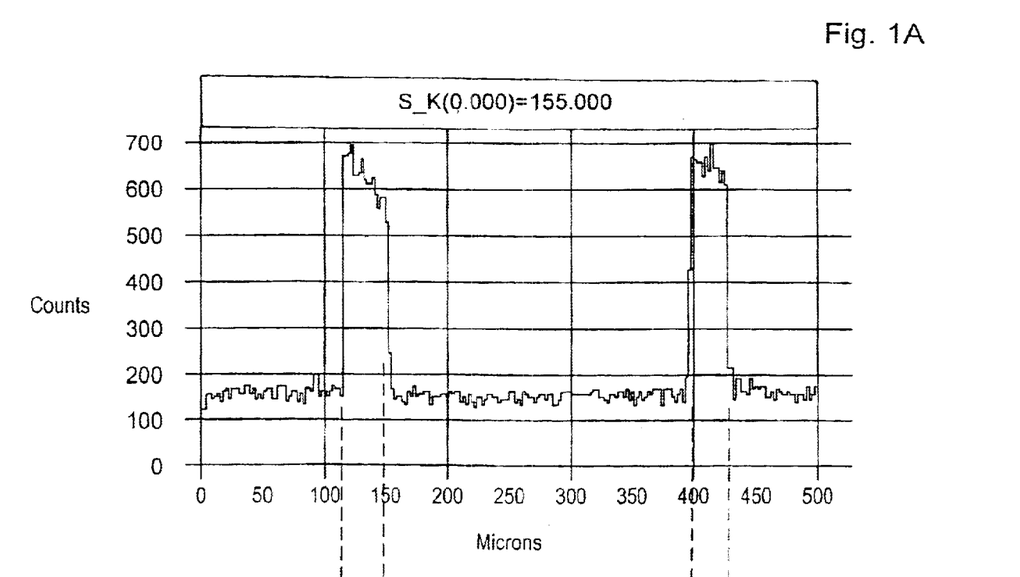
Figure 1B:
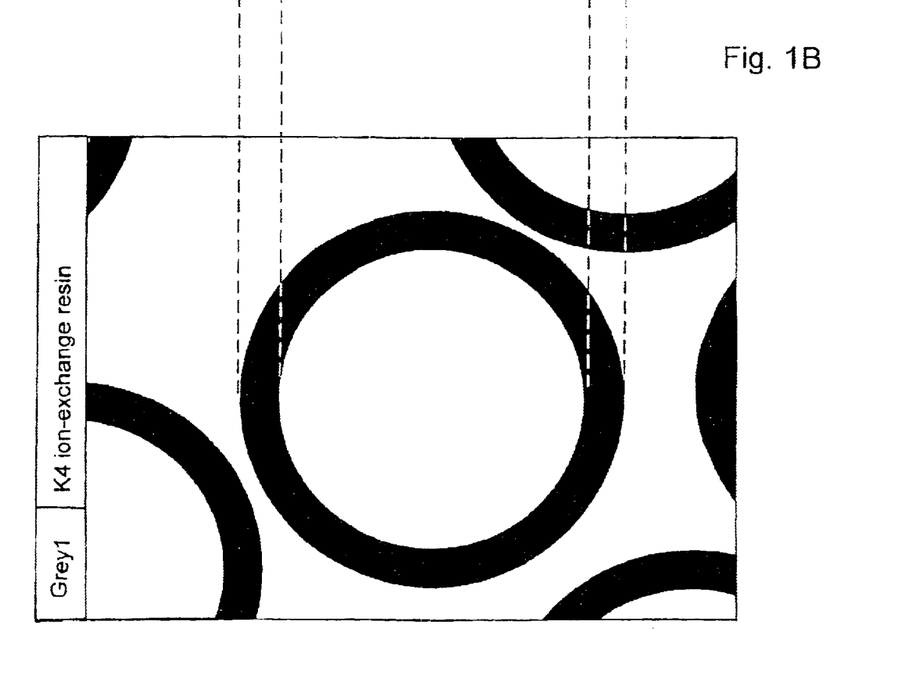
Figure 2A:
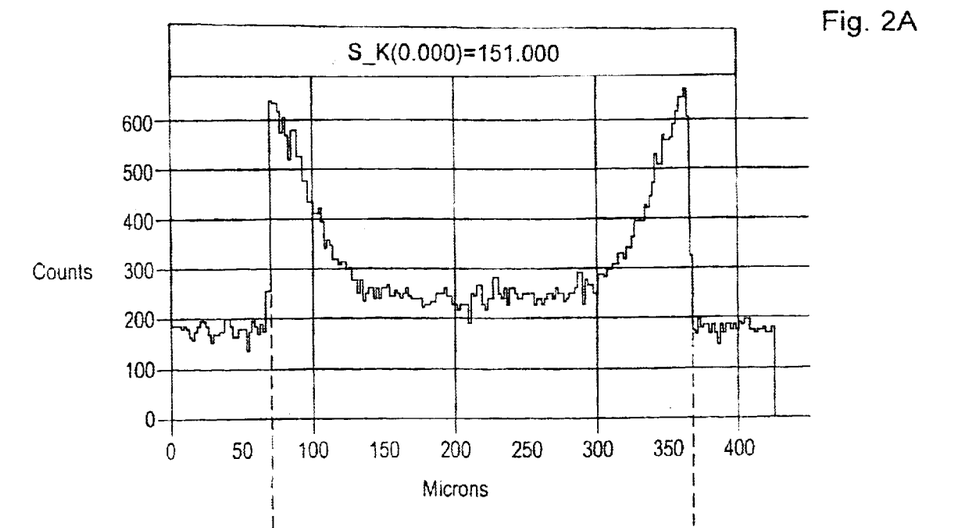
Figure 2B:
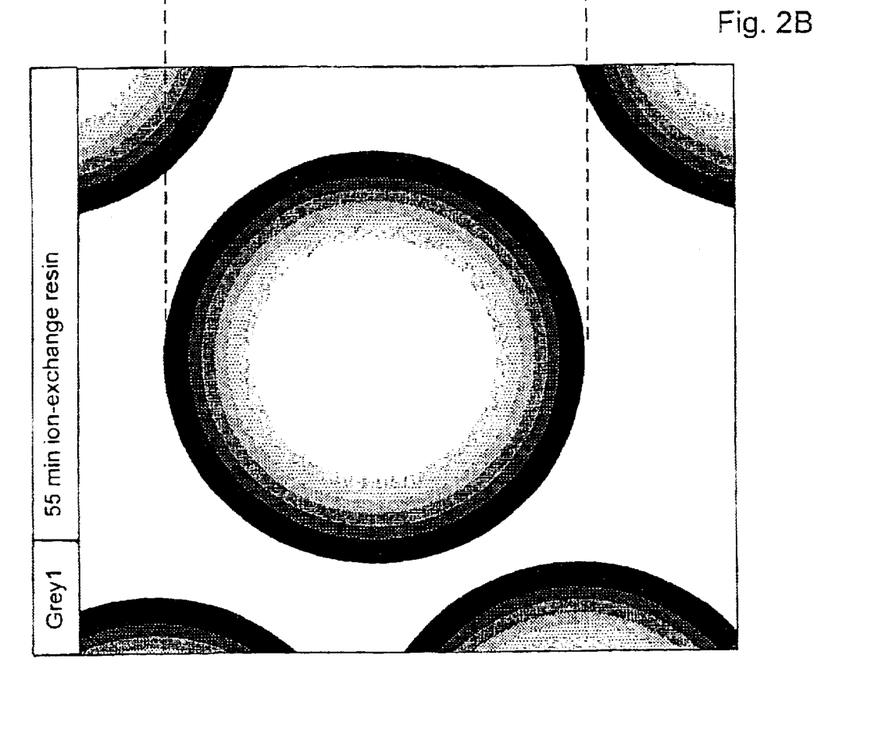

The dry weight capacity and volume capacity were determined as follows:

Five ml of resin in the $H^+$ form was packed into a 15 ml glass column. Ion-exchanged water was passed through the column until the pH of the rinsing water exceeded 5. The resin was thereafter regenerated into the $Na^+$ form by running 20 bed volumes of 10% NaCl solution through the column for a minimum contact time of 30 min. The solution that passed through the column was gathered and titrated with 1-M NaOH solution in the presence of a phenolphthalein indicator. The resin was thereafter restored to the $H^+$ form by running 20 bed volumes of 5% hydrochloric acid through the column for a minimum contact time of 30 min. The resin bed was then rinsed with fully desalted water until the pH value of the rinsing water exceeded 5. The column was shaken until the bed volume no longer changed and the bed volume in the $H^+$ form was readable. The entire resin batch was thereafter transferred to a heating chamber and dried at 110° C. for 16 hr, and the dry weight of resin was weighed. The dry weight capacity and volume capacity were calculated as follows:

$$Q_{dm} = c_{NaOH} \cdot V_{NaOH} / m_d$$

$$Q_V = c_{NaOH} \cdot V_{NaOH} / V_{resin}$$

wherein $Q_{dm}$=dry weight capacity $Q_V$=volume capacity $c_{NaOH}$=NaOH concentration $V_{NaOH}$ = NaOH consumption in titration $m_d$ = dry weight of resin in the H⁺ form $V_{resin}$ = volume of resin bed in the H⁺¹ form The results of the sulphonation are shown in Table 1, which indicates the degree of sulphonation in the form of dry weight capacity (meq/g). FIGS. 1A and 1B also show the cross-section (FIG. 1B) and sulphur profile (FIG. 1A) of the sulphonated product according to the invention prepared by the SO₃ sulphonation technique. FIGS. 2A and 2B show by way of comparison the cross-section (FIG. 2B) and sulphur profile (FIG. 2A) of a corresponding product obtained by sulphuric acid sulphonation (carried out by using dichlorethane as a swelling agent).

TABLE 1

| T °C. | t hr | Polymer fraction μm | Dry weight capacity meq/g |
|---|---|---|---|
| 60 | 0.5 | 250–280 | 1.80 |
|  | 1.0 | 250–280 | 2.35 |
|  | 3.0 | 250–280 | 3.52 |
| 40 | 0.5 | 250–280 | 0.64 |
|  | 1.0 | 250–280 | 0.82 |
|  | 3.0 | 250–280 | 1.26 |
|  | 6.0 | 250–280 | 1.64 |
|  | 12.0 | 250–280 | 1.94 |
|  | 24 | 250–280 | 2.23 |
|  | 0.5 | 125–140 | 1.12 |
|  | 1.0 | 125–140 | 1.37 |
|  | 3.0 | 125–140 | 2.03 |
|  | 12.0 | 125–140 | 3.02 |
| 20 | 0.5 | 250–280 | 0.09 |
|  | 1.0 | 250–280 | 0.15 |
|  | 3.0 | 250–280 | 0.26 |
|  | 6.0 | 250–280 | 0.36 |
|  | 12.0 | 250–280 | 0.43 |
|  | 24.0 | 250–280 | 0.59 |

The results show that the SO₃ sulphonation according to the invention provides a cation-exchange resin where the sulphonated shell layer has a very distinct outline. Furthermore, the depth, dry weight capacity and volume capacity of the produced shell layer can be adjusted by selecting a desired reaction temperature and time. The results also show that the process enables the preparation of fully sulphonated polymer resins.

EXAMPLE 2

Effect of a Reduced Pressure on the Speed of Sulphonation

The effect of a reduced pressure (vacuum) on sulphonation was examined by performing sulphonation according to the invention in a vacuum (50 Pa) and, by way of comparison, at a normal pressure. The tests were conducted by using as a starting material the material of Example 1 with a screening fraction of 250 to 280 μm. Sulphonation operations were carried out in a vacuum as described in Example 1. In the comparative sulphonation operations the reaction space and the space containing the oleum were not subjected to a reduced pressure, but the diluting gas components were present during the sulphonation. The results given in Table 2 illustrate how vacuum treatment accelerates sulphonation. The pressure values given in Table 2 refer to the pressure in the reaction space at the beginning of sulphonation.

TABLE 2

| Pressure | T °C. | t hr | Dry weight capacity meq/g |
|---|---|---|---|
| Normal pressure | 64 | 3.0 | 0.37 |
| Normal pressure | 64 | 6.0 | 1.53 |
| Normal pressure | 84 | 1.5 | 0.44 |
| Normal pressure | 84 | 3.0 | 0.78 |
| Normal pressure | 84 | 6.0 | 3.60 |
| 50 Pa | 60 | 0.5 | 1.80 |
| 50 Pa | 60 | 1.0 | 2.35 |
| 50 Pa | 60 | 3.0 | 3.52 |
| 50 Pa | 60 | 6.0 | 4.28 |
| 50 Pa | 60 | 12.0 | 5.06 |

The results clearly show that the removal of air from the reaction space and from the copolymer accelerates the sulphonation with sulphur trioxide in gas phase. For example a temperature of 60° C. and a sulphonation time of 6 hr provided the product with a dry weight capacity of only 1.53 meq/g in sulphonation at a normal pressure, whereas the sulphonation according to the invention in a vacuum produced a capacity of 4.28 meq/g.

EXAMPLE 3

Sulphonation with Different Degrees of Cross-linking

A sulphonation reaction was carried out by using as a starting material a gel-type styrene-DVB copolymer with a varying degree of cross-linking. The cross-linking degrees were 5.5% DVB, 4.0% DVB and 1.0% DVB. A screening fraction with a sphere size of 250 to 280 μm was used. The temperature of sulphonation was 40° C. and the sulphonation time varied between 0.5 and 6.0 hr. The sulphonation conditions were otherwise similar to Example 1.

The sulphonation results are shown in Table 3.

TABLE 3

| Cross-linking degree % DVB | t hr | Dry weight capacity meq/g |
|---|---|---|
| 5.5 | 0.5 | 0.64 |
|  | 1.0 | 0.82 |
|  | 3.0 | 1.26 |
|  | 6.0 | 1.64 |
|  | 12.0 | 1.94 |
|  | 24 | 2.23 |
| 4.0 | 1.0 | 1.15 |
|  | 3.0 | 1.70 |
|  | 6.0 | 2.42 |
| 1.0 | 1.0 | 2.73 |
|  | 3.0 | 2.73 |
|  | 6.0 | 3.24 |

The results show that as the cross-linking degree decreases, the sulphonation speed increases significantly. It was also found that the sulphonation of the shell layer also takes place at lower degrees of cross-linking.

EXAMPLE 4

Degree of Breakage of the Product

The sulphonation was carried out by using as a starting material a gel-type styrene-DVB copolymer with a cross-linking degree of 5.5% DVB. The screening fraction of the polymer varied from 250 to 280 μm. The sulphonation was carried out at 60° C. and the sulphonation time varied between 0.5 and 24 hr. Otherwise the sulphonation conditions were similar to Example 1.

The results are shown in Table 4.

TABLE 4

| T °C. | t hr | Dry weight capacity meq/g | Percentage of breakage % |
|---|---|---|---|
| 60 | 0.5 | 1.80 | 0 |
| 60 | 1.0 | 2.35 | 0 |
| 60 | 3.0 | 3.52 | 5 |

Table 4 shows that spherical cation-exchange resin particles with sulphonated shell layers prepared with the process according to the invention remained mechanically unbroken at least to a capacity of about 3.5 meq/g. However, resin products with a higher capacity are useful for example as raw material for pulverized ion-exchange resins.

EXAMPLE 5

Specific Swelling

Specific swelling was examined with $SO_3$-sulphonated styrene-DVB copolymer resins prepared according to the invention with cross-linking degrees of 4.0% DVB and 5.5% DVB. A screening fraction of 250 to 280 μm was used. A comparative test was carried out with commercial $H_2SO_4$-sulphonated resin with the same cross-linking degree, prepared by using dichlorethane as a swelling agent.

Specific swelling was determined by measuring the amount of water in the resin in proportion to the number of equivalents in the resin ion exchange sites.

The resin water content was determined as follows:

2 g of $H^+$ resin fully swollen in water was centrifuged for 10 min at 2500 rpm in a centrifugal tube with a grid bottom. Three 0.5 g parallel samples were weighed from the centrifuged resin and dried at 110° C. for 16 hr. The water content was calculated from the equation:

$$X_{H2O}=(m_w-m_d)/m_w$$

wherein $X_{H2O}$=resin water content $m_w$=mass of centrifuged resin $m_d$=dry mass of resin The specific swelling of the resin can be calculated when the dry weight capacity of the resin is also known:

Mass of water ($m_{H2O}$) per dry weight of resin:

$$m_{H2O}/m_d=X_{H2O}/(1-X_{H2O})$$

Specific swelling of resin:

$$n(H_2O)/n(R-SO_3H)=(m_{H2O}/m_d\cdot 1/M_{H2O})/Q_{dm}$$

wherein $n(H_2O)$=molar amount of water $n(R-SO_3H)$=molar number of ion exchange sites $M_{H2O}$=molar mass of water.

The results are shown in Table 5.

TABLE 5

| Sulphonation reagent | Cross-linking degree % DVB | Dry weight capacity meq/g | Specific swelling $n(H_2O)/n(R-SO_3H)$ |
|---|---|---|---|
| $SO_3$ | 1.0 | 2.7 | 17.6 |
| $SO_3$ | 4.0 | 2.1 | 7.68 |
| $SO_3$ | 5.5 | 2.3 | 6.66 |
| $H_2SO_4$ + EDC swelling | 5.5 | 5.2 | 16.5 |

The results show that when sulphonation is carried out by gaseous sulphur trioxide, the obtained cation-exchange resin has different swelling properties compared with a resin sulphonated conventionally with sulphuric acid. A cation exchanger cross-linked with 1% DVB and sulphonated with sulphur trioxide has similar specific swelling as a resin cross-linked with 5.5% DVB and sulphonated with sulphuric acid. Correspondingly, the specific swelling of $SO_3$-sulphonated resin cross-linked with 5.5% DVB is similar to that of a resin cross-linked with 14% DVB and sulphonated with sulphuric acid (K. W. Pepper, "Sulphonated cross-linked polystyrene: monofunctional cation-exchange resin", *J. Appl. Chem.* (London), No 1, 1951).

EXAMPLE 6

Resistance to Oxidation

The resistance to oxidation of a cation exchanger sulphonated with sulphur trioxide was examined by means of hydrogen peroxide treatment, during which the volume capacity and specific swelling of the resin were monitored. The variation in the aforementioned values indicates the breaking up of the resin cross-linking. The material examined was a resin cross-linked with 5.5% DVB, sulphonated with sulphur trioxide and having a particle size of 300 μm. Comparative resins were materials cross-linked with 4 and 5.5% DVB and sulphonated with sulphuric acid, with a mean sphere size of about 330 μm.

The resistance to oxidation was tested as follows: 10 g of $H^+$ resin filtered to an air-dry form was weighed into a test tube, and 10 ml of 30% hydrogen peroxide was added. The test tube was closed and its temperature adjusted to 60° C. The treatment times were 1, 3, 5 and 7 days. After the treatment the volume capacity and the specific swelling were determined from the resin samples similarly as described in Examples 1 and 5.

The results are shown in Tables 6 and 7.

TABLE 6

| Cross-linking degree Sulphonation method Time Days | 4% DVB $H_2SO_4$ + EDC Volume capacity eq/l | 5.5% DVB $H_2SO_4$ + EDC Volume capacity eq/l | 5.5% DVB $SO_3$ Volume capacity eq/l |
|---|---|---|---|
| 0 | 1.06 | 1.41 | 1.23 |
| 1 | 0.79 | 1.12 | 1.07 |
| 3 | 0.40 | 0.49 | 1.09 |
| 5 | 0.04 | 0.15 | 1.00 |
| 7 | destroyed | destroyed | 0.81 |

TABLE 7

| Cross-linking degree | 4% DVB | 5.5% DVB | 5.5% DVB |
|---|---|---|---|
| Sulphonation method | $H_2SO_4$ + EDC | $H_2SO_4$ + EDC | $SO_3$ |
| Time Days | Specific swelling $n(H_2O)/n(RSO_3H)$ | Specific swelling $n(H_2O)/n(RSO_3H)$ | Specific swelling $n(H_2O)/n(RSO_3H)$ |
| 0 | 25.0 | 17.8 | 6.87 |
| 1 | 39.3 | 35.1 | 8.08 |
| 3 | 74.8 | 61.7 | 9.52 |
| 5 | destroyed | 76.4 | 9.97 |
| 7 | destroyed | destroyed | 16.6 |

The results show that after seven days of treatment the resin sulphonated with sulphuric acid had been completely destroyed, whereas the resin according to the invention only exhibited reduced activity and a lower degree of cross-linking.

The results of the example thus clearly show that sulphur trioxide sulphonation provides a cation-exchange resin with considerably better resistance to oxidation than a conventional resin sulphonated with sulphuric acid.

EXAMPLE 7

Resistance to Osmotic Shock

The test was carried out by using an $SO_3$-sulphonated styrene-DVB copolymer resin according to the invention with a cross-linking degree of 5.5% DVB. The average particle size of the resin was 300 μm. A comparative resin was a corresponding resin prepared by the sulphuric acid method and having an average particle size of 336 μm.

The tests were conducted as follows: 5 ml of resin was packed into a 10 ml test column. A solution cycle of 0.5 mol/l $H_2SO_4$-water-4 mol/l NaOH-water was pumped through the column at a flow rate of 15 ml/min such that the duration of pumping in each phase was 5 min. The solution cycle was performed 100 times on each resin to be tested. After the test the resins were photographed and the proportion of broken particles was calculated from the photographs.

It was found that all the $SO_3$-sulphonated particles according to the invention were unbroken, whereas some of the particles sulphonated with sulphuric acid were broken (93% unbroken).

EXAMPLE 8

Osmotic Shrinkage

Osmotic shrinkage was examined with the same resins as in Example 6. The test was conducted with resins converted into the $Na^+$ form such that about 10 ml of resin equilibrated with ion-exchanged water was first packed into a glass column. A series of NaCl solutions with different concentrations (0.1 to 5.0 mol/l) were thereafter passed through the column, and the bed volumes equilibrated with the different concentrations of the solution were measured.

The results are shown in Table 8.

TABLE 8

| $C_{NaCl}$ mol/l | Resin sulphonated with sulphuric acid 5.5% DVB, 5.2 meq/g Bed volume ml | $SO_3$-sulphonated resin 5.5% DVB, 2.3 meq/g Bed volume ml |
|---|---|---|
| 0 | 9.90 | 9.90 |
| 0.1 | 8.90 | 9.70 |
| 0.5 | 8.45 | 9.70 |
| 1.0 | 8.10 | 9.70 |
| 3.0 | 7.30 | 9.70 |
| 5.0 | 6.70 | 9.70 |

The results show that the bed volume of the resin according to the invention remained almost unchanged, whereas the comparative resin exhibited significant osmotic shrinkage. This is a significant advantage of a resin sulphonated with sulphur trioxide regardless of whether it is used for ion exchange or chromatographic separation, since in column operations strong movement of the bed subjects the ion exchange material to mechanical stresses and impairs the result of the separation by producing flow channelling and spreading of the chromatographic front.

EXAMPLE 9

Compression Resistance

The test was conducted by using an $SO_3$-sulphonated styrene-DVB copolymer resin according to the invention with a cross-linking degree of 5.5% DVB. The average particle size of the resin was 400 μm and the dry weight capacity was 2.5 meq/g. A comparative resin was a cross-linked styrene-DVB copolymer resin sulphonated with the sulphuric acid method and having a cross-linking degree of 5.5% DVB, an average particle size of 400 μm and a dry weight capacity of 5.18 meq/g.

The compression resistance was tested by a compressing apparatus which measures the breaking strength. The test was conducted by using one bead per test. The results are shown in Table 9.

TABLE 9

| Material | Breaking strength N/particle |
|---|---|
| Sulphonated with sulphuric acid | 2.1 |
| $SO_3$-sulphonated | >19.6 |

The results show that the force required to break a resin bead with a sulphonated shell layer is many times the force required to break a resin fully sulphonated with sulphuric acid. The preparation process according to the invention thus provides a gel-type cation-exchange resin with excellent mechanical strength.

EXAMPLE 10

Degree of Packing Under Pressure

The test was conducted by using an $SO_3$-sulphonated styrene-DVB copolymer resin according to the invention with a cross-linking degree of 5.5% DVB, an average particle size of 300 μm and a dry weight capacity of 2.3 meq/g.

A comparative resin was a styrene-DVB copolymer resin sulphonated with the sulphuric acid method and having a cross-linking degree of 5.5% DVB, an average particle size of 336 μm and a dry weight capacity of 5.2 meq/g.

The packing degree of the resin was examined as follows: 20 ml of Na⁺ resin was packed into a test column of the type Pharmacia XK 16/40. The resin bed was filled with water and packed first by shaking, whereafter the bed porosity was measured by a Blue Dextran pulse response. The bed was then compressed by tightening a surface control adapter, whereafter the bed porosity was measured again.

The results of the bed porosity measurement are shown in Table 10.

The measurements showed that the adapter used was not sufficient to compress the SO₃-sulphonated resin. Instead, a resin sulphonated with sulphuric acid with a corresponding DVB cross-linking degree was compressed rather easily. After the compression the porosity of the resin bed sulphonated with sulphuric acid had decreased about 25% of the original value. This shows the usefulness of the resin according to the invention in packed columns in processes under pressure.

TABLE 10

| Material | Initial bed porosity % | Final bed porosity % |
|---|---|---|
| Sulphonated with sulphuric acid | 35 | 26 |
| SO₃-sulphonated | 36 | 36 |

EXAMPLE 11

Desulphonation

The stability of the sulphonic acid group linked to a copolymer matrix was examined by means of an SO₃-sulphonated styrene-DVB copolymer resin according to the invention with a cross-linking degree of 5.5% DVB and a sulphonation degree (in dry weight capacity) of 5.08 meq/g. A comparative resin was a corresponding resin sulphonated with the sulphuric acid method and having a cross-linking degree of 5.5% DVB and a sulphonation degree (in dry weight capacity) of 5.18 meq/g.

The tests were carried out as follows: resin in the H⁺ form was kept in a heating chamber at 110° C. in air. The desulphonation of the resin was monitored for 63 days by measuring the dry weight capacity about every 20 days.

The test results are shown in Table 11.

TABLE 11

| Sulphonation method Time Days | Sulphuric acid Dry weight capacity meq/g | SO₃ Dry weight capacity meq/g |
|---|---|---|
| 0 | 5.18 | 5.08 |
| 20 | 5.11 | 5.05 |
| 42 | 5.06 | 5.02 |
| 63 | 5.03 | 4.95 |

The results show that both resins examined have approximately a similar rate of desulphonation.

EXAMPLE 12

Use of the Resin According to the Invention in Size Exclusion Chromatography

A chromatographic test was conducted by using an SO₃-sulphonated styrene-DVB copolymer resin according to the invention with a cross-linking degree of 5.5% DVB, an average particle size of 300 μm and a dry weight capacity of 2.3 meq/g. A comparative resin was a corresponding resin sulphonated with the sulphuric acid method and having an average particle size of 336 μm and a dry weight capacity of 5.2 meq/g.

The chromatographic tests were conducted by using an FPLC chromatographic unit of Pharmacia Biotech provided with UV, refractive index and conductivity detectors. The test column was Pharmacia XK 16/40. The tests were carried out by using 85 ml of Na⁺ resin that was packed into the column. Pulse responses were measured by Blue Dextran (unretained component), methanol, glycerol and saccharose. The tests were carried out at a flow rate of 0.25 ml/min, the feed sample volume was 0.5 ml and sample concentration 0.25 mol/l. Separation factors for glycerol, glucose and fructose with respect to methanol were calculated from the pulse responses as follows:

$$K_i = t_i/t_0$$

wherein $K_i$ = adsorption equilibrium constant of component i $t_i$ = retention time of component i $t_0$ = retention time of unretained component (Blue Dextran)

$$\alpha_{i/met} = K_i/K_{met}$$

wherein $\alpha_{i/met}$ = separation factor of component i with respect to methanol $K_{met}$ = adsorption equilibrium constant of methanol The results are shown in Table 12.

TABLE 12

|  | Sulphonated with sulphuric acid | SO₃-sulphonated |
|---|---|---|
| $\alpha_{saccharose/met}$ | 0.355 | 0.039 |
| $\alpha_{glucose/met}$ | 0.559 | 0.203 |
| $\alpha_{glycerol/met}$ | 0.741 | 0.490 |

The results show that the cut-off size of the SO₃-sulphonated resin cross-linked with 5.5% DVB is close to the molecular size of saccharose. The material according to the invention is thus suitable for the separation of molecules of the same size as saccharose from smaller molecules on the basis of size exclusion.

EXAMPLE 13

Use of the Resin According to the Invention in the Chromatographic Separation of Saccharose and Glycerol The test was conducted by using the same resins as in Example 12.

Chromatographic separation tests were conducted to measure the pulse responses of saccharose and glycerol in resin beds of different heights by using the same chromatographic unit and test column as in Example 12.

The test conditions were as follows: flow rate 0.25 ml/min, sample volume 0.5 ml and the following sample concentrations:

1) $c_{saccharose}$ = 0.25 mol/l, $c_{glycerol}$ = 1.00 mol/l
2) $c_{saccharose}$ = 0.15 mol/l, $c_{glycerol}$ = 0.60 mol/l
3) $c_{saccharose}$ = 0.05 mol/l, $c_{glycerol}$ = 0.20 mol/l Resolution and dilution factor were calculated from the pulse responses of glycerol and saccharose measured in beds of different heights as follows:

$$R_s = 2(t_2-t_1)/(w_1+w_2)$$

wherein
 $R_s$ = resolution
 $t_2$ = retention time of peak 2
 $t_1$ = retention time of peak 1
 $w_1$ = width of peak 1
 $w_2$ = width of peak 2

$$L_i = h/A$$

wherein
 $L_i$ = dilution factor of component i
 h = height of chromatographic pulse response
 A = area of chromatographic pulse response
The following results were obtained:
$SO_3$-sulphonated 5.5 % DVB:

| Resolution: | Dilution factor: Saccharose: | Glycerol: |
|---|---|---|
| 1.09 | 0.18 | 0.18 |
| 0.70 | 0.50 | 0.32 |
| 0.52 | 0.55 | 0.37 |
| 0.58 | 0.35 | 0.36 |

Finex CS11G 5.5% DVB:

| Resolution: | Dilution factor: Saccharose: | Glycerol: |
|---|---|---|
| 1.54 | 0.09 | 0.09 |
| 1.16 | 0.13 | 0.13 |
| 0.90 | 0.18 | 0.18 |
| 0.89 | 0.18 | 0.18 |
| 0.74 | 0.22 | 0.24 |
| 0.51 | 0.28 | 0.32 |

Figure 3:
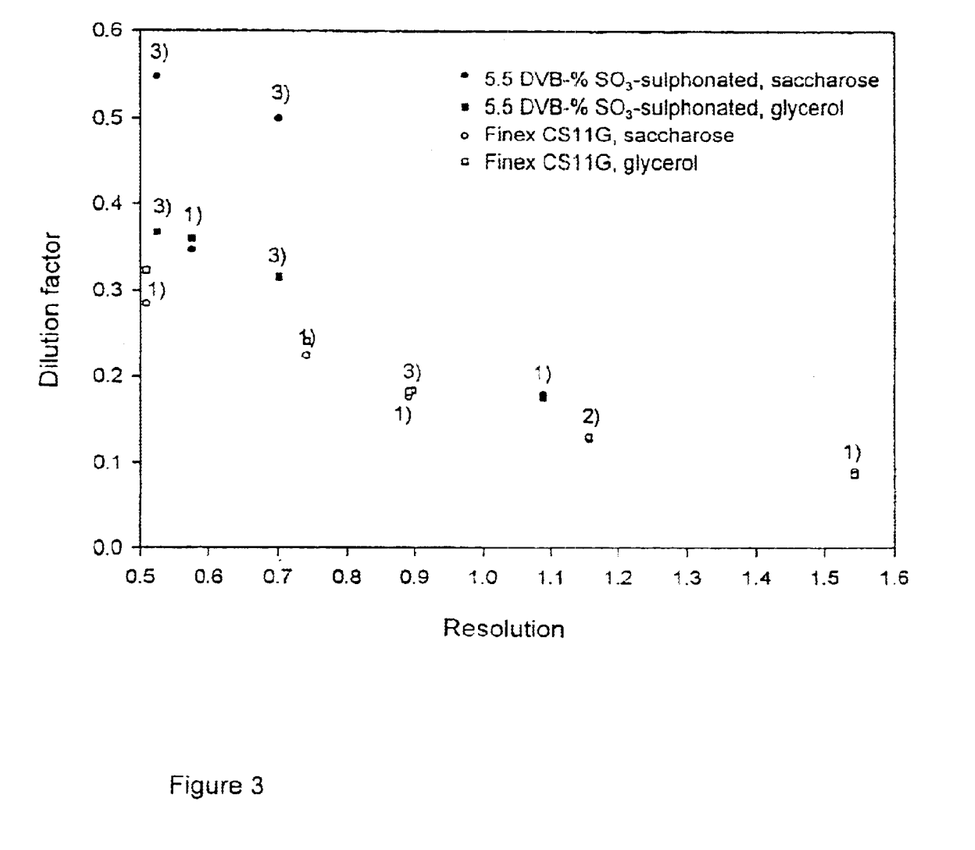

The results are shown graphically in FIG. 3.

The results show that separation based on size exclusion is more effective with the resin according to the invention when the resolution level is less than about 1.2. This means that in the case of a resin with an $SO_3$-sulphonated shell layer, product fractions below this limit are diluted less at the same resolution level than in the case of a resin sulphonated with sulphuric acid. It should be noted that in the SMB (Simulated Moving Bed) technique presently employed in industrial chromatographic separation the resolution level is typically between 0.5 and 2.0. The lower degree of dilution of the product reduces the costs considerably in the concentration of the product fraction by evaporation.

EXAMPLE 14

Use of the Resin According to the Invention in Ion Exchange

The same resins and chromatographic apparatus were used as in Example 12.

Ion exchange tests were conducted as follows: a bed of 9.9 cm in height of $Na^+$ resin was packed into a test column of the type Pharmacia XK 16/40. The total bed capacity with an $SO_3$-sulphonated resin was thus 30 meq and with a comparative resin 34 meq. The operation of the resin according to the invention in the softening of water was examined by measuring a breakthrough curve of the $Ca^{2+}$ ion when the feed solution was $CaCl_2$ with a concentration (Ca content) of 250 ppm. The tests were conducted at flow rates of 8 ml/min and 2 ml/min.

The column properties were as follows:

| Resin | $SO_3$-sulphonated | CS11G |
|---|---|---|
| Cross-linking degree, % by weight of DVB | 5.5 | 5.5 |
| Capacity, meq/g | 2.3 | 5.1 |
| Capacity, eq/L | 1.4 | 1.5 |
| Bed volume, mL | 19.9 | 19.9 |
| Bed porosity | 0.33 | 0.34 |

The following results were obtained (softening of water, Na/Ca):

| Resin | $SO_3$-sulphonated | $SO_3$-sulphonated |
|---|---|---|
| Flow rate, mL/min | 8.0 | 2.0 |
| 5% breakthrough point, mL | 2360 | 2414 |
| Concentration at breakthrough point, ppm | 13.3 | 13.7 |
| Ca sorption at breakthrough point, mmol | 14.7 | 15.1 |

| Resin | CS11G | CS11G |
|---|---|---|
| Flow rate, mL/min | 8.0 | 2.0 |
| 5% breakthrough point, mL | 2350 | 2404 |
| Concentration at breakthrough point, ppm | 14.0 | 13.6 |
| Ca sorption at breakthrough point, mmol | 14.7 | 15.0 |

Figure 4:
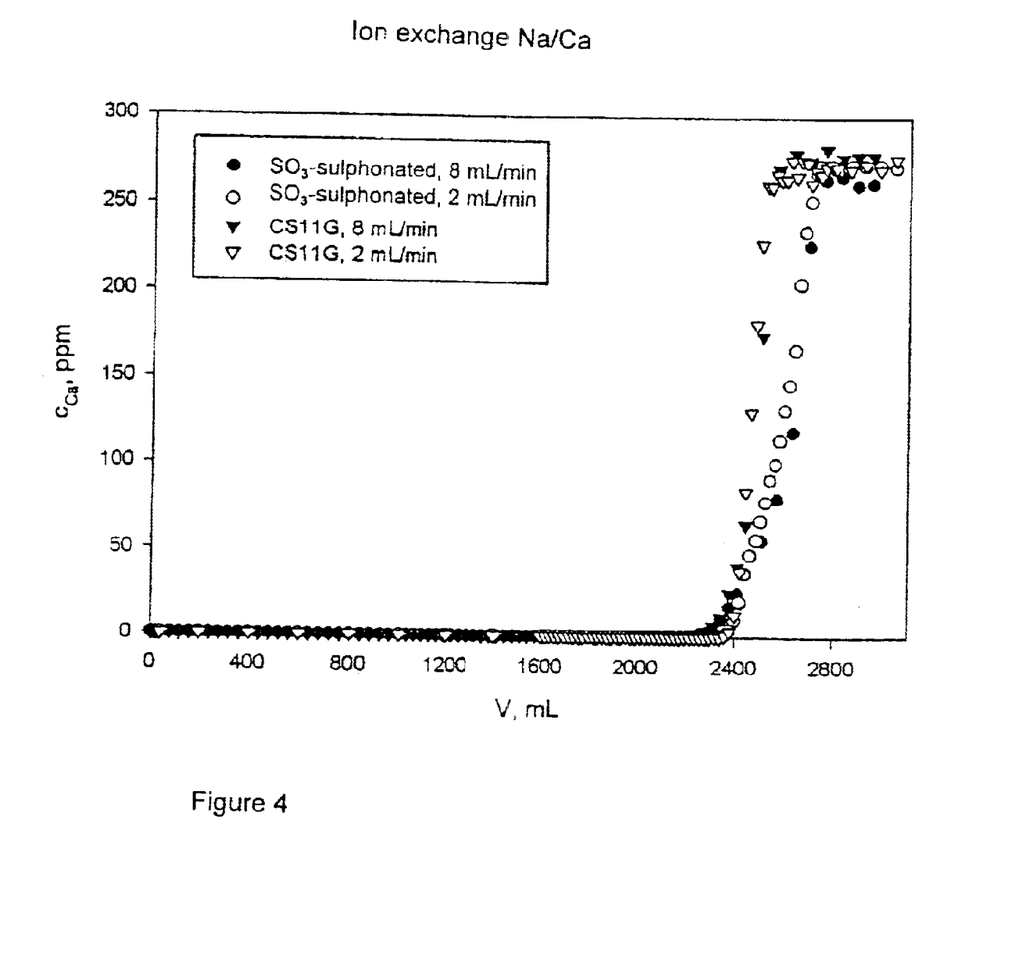

The breakthrough curves of the calcium ion are shown graphically in FIG. 4.

Table 13 also shows the breakthrough volumes of the breakthrough curve.

TABLE 13

| | $SO_3$-sulphonated 2 ml/min | $SO_3$-sulphonated 8 ml/min | $H_2SO_4$-sulphonated 2 ml/min | $H_2SO_4$-sulphonated 8 ml/min |
|---|---|---|---|---|
| Breakthrough volume of breakthrough curve, ml | 2414 | 2360 | 2404 | 2350 |

The results show that the breakthrough curves reach the breakthrough point slightly later with the $SO_3$-sulphonated resin even though the bed capacity is lower. Thus, the resin sulphonated with sulphur trioxide works better than the comparative resin in the recovery of $Ca^{2+}$ as regards both the bed capacity and the bed volume. Furthermore, the resin according to the invention was found to have an advantage that its bed volume did not change at all in the saturation point, whereas the resin sulphonated with sulphuric acid shrank about 5%.

EXAMPLE 15

Preparation and Testing of a Macroporous Catalyst Resin

The process according to the invention was used to prepare a strong cation exchanger from a macroporous polystyrene-DVB copolymer with a cross-linking degree of 12% DVB, and the applicability of the exchanger in catalytic applications was examined by comparing the activity in an esterification reaction between ethanol and acetic acid. A comparative resin was macroporous Amberlyst 15 resin (Rohm & Haas).

The macroporous resin according to the invention was prepared by sulphonation at 60° C. as described in Example 1, and the dry weight capacity of the resin was adjusted to 2.9 meq/g. The dry weight capacity of the comparative resin, Amberlyst 15, was 4.7 meq/g.

The esterification processes were conducted as follows: the starting materials were 96.1% ethanol and 99.9% acetic acid. 104 ml of ethanol and 103 ml of acetic acid were measured into a 500 ml round-bottomed flask provided with horseshoe mixers. An amount of resin corresponding to 20 meq was weighed into the reaction mixture, and the reaction was activated by raising the temperature of the mixture to 70° C. The progression of the reaction was monitored by measuring the amount of acetic acid in the mixture as a function of the reaction time. The conversion (X) of the reaction was calculated from the results as follows:

$$X=131\;[(C_{AA,0}-C_{AA(t)})/C_{AA,0}]$$

wherein $C_{AA,0}$=concentration of acetic acid at instant 0
$C_{AA(t)}$=concentration of acetic acid at instant t.

The conversion of the reaction as a function of time with the examined resins is illustrated in Table 14.

TABLE 14

| Time, min | SO$_3$-sulphonated 12% DVB 2.9 meq/g Conversion | Amberlyst 15 4.7 meq/g Conversion |
|---|---|---|
| 2 | 0.024 | 0.033 |
| 4 | 0.056 | — |
| 6 | 0.081 | 0.053 |
| 8 | 0.096 | 0.093 |
| 10 | 0.116 | 0.103 |
| 15 | 0.173 | 1.120 |
| 20 | 0.230 | 0.150 |
| 25 | 0.254 | 0.191 |
| 30 | 0.293 | 0.206 |
| 40 | 0.355 | 0.249 |
| 50 | 0.399 | 0.308 |
| 60 | 0.439 | 0.334 |
| 80 | 0.493 | 0.388 |
| 100 | 0.524 | 0.436 |
| 120 | 0.550 | 0.472 |
| 150 | 0.575 | 0.494 |
| 180 | 0.592 | 0.530 |
| 210 | 0.603 | 0.550 |
| 240 | 0.608 | 0.567 |
| 270 | 0.610 | 0.585 |
| 300 | 0.611 | 0.599 |
| 360 | 0.614 | 0.610 |
| 420 | — | 0.614 |

The results show that the macroporous catalyst resin according to the invention has better activity than a conventional fully sulphonated macroporous resin.

It is obvious to those skilled in the art that as the technology develops the basic idea of the invention can be implemented in various ways. The invention and the embodiments thereof are thus not restricted to the examples described above, but they may vary within the scope of the claims.

What is claimed is:

1. A sulphonated alkenylaromatic polymer resin in a particle form, wherein said polymer resin is prepared by sulphonating non-swollen alkenylaromatic polymer particles with substantially pure gaseous sulphur trioxide substantially in the shell layer of the polymer particles.

2. The polymer resin according to claim 1, wherein said polymer resin is prepared by subjecting a reaction space containing the polymer to a reduced pressure before the sulphonation.

3. The polymer resin according to claim 2, wherein said reaction space is subjected to a pressure of less than 10000 Pa.

4. The polymer resin according to claim 2, wherein said reaction space is subjected to a pressure of less than 1000 Pa.

5. The polymer resin according to claim 2, wherein said reaction space is subjected to a pressure of between 50 and 100 Pa.

6. The polymer resin according to claim 1, wherein said polymer is a cross-linked alkenylaromatic polymer.

7. The polymer resin according to claim 6, wherein said polymer has a styrene skeleton.

8. The polymer resin according to claim 6, wherein the cross-linking agent is an alkenylaromatic or aliphatic cross-linking agent.

9. The polymer resin according to claim 8, wherein said alkenylaromatic or aliphatic cross-linking agent is divinylbenzene, isoprene, allyl methacrylate, vinyl methacrylate, glycol dimethacrylate or glycol diacrylate.

10. The polymer resin according to claim 1, wherein said polymer is a gel-type polymer.

11. The polymer resin according to claim 1, wherein said polymer is a styrene-divinylbenzene copolymer.

12. The polymer resin according to claim 10, wherein the cross-linking degree of the polymer is between 0.5 and 12% DVB.

13. The polymer resin according to claim 12, wherein the cross-linking degree of the polymer is between 1 and 10% DVB.

14. The polymer resin according to claim 11, wherein the cross-linking degree of the polymer is between 0.5 and 12% DVB.

15. The polymer resin according to claim 14, wherein the cross-linking degree of the polymer is between 1 and 10% DVB.

16. The polymer resin according to claim 1, wherein said polymer is a macroporous polymer.

17. The polymer resin according to claim 16, wherein the cross-linking degree of the polymer is between 4 and 30% DVB.

18. The polymer resin according to claim 17, wherein the cross-linking degree of the polymer is between 8 and 20% DVB.

19. The polymer resin according to claim 1, wherein said polymer is sulphonated at a temperature of 20 to 120° C.

20. The polymer resin according to claim 19, wherein said polymer is sulphonated at a temperature of 40 to 80° C.

21. The polymer resin according to claim 1, wherein the sulphonation degree of the polymer is between 0.1 and 5.5 meq/g.

22. The polymer resin according to claim 21, wherein the sulphonation degree of the polymer is between 0.2 and 5.5 meq/g.

23. The polymer resin according to claim 22, wherein the sulphonation degree of the polymer is between 0.2 and 4.2 meq/g.

24. The polymer resin according to claim 23, wherein the sulphonation degree of the polymer is between 1 and 3 meq/g.

25. The polymer resin according to claim 1, wherein said polymer is in a spherical form.

26. The polymer resin according to claim 1, wherein the particle size distribution of the polymer is between 1 and 1.7, indicated in UC units.

27. The polymer resin according to claim 26, wherein the particle size distribution of the polymer is between 1 and 1.25, indicated in UC units.

28. The polymer resin according to claim 1, wherein said polymer is in a pulverized form.

29. The polymer resin according to claim 1, wherein said polymer resin is an ion-exchange resin.

30. The polymer resin according to claim 29, wherein said ion-exchange resin is a strongly acidic cation-exchange resin.

31. A process for preparing a sulphonated alkenylaromatic polymer resin in a particle form, comprising sulphonating alkenylaromatic polymer particles in a non-swollen state with substantially pure gaseous sulphur trioxide substantially in the shell layer of the polymer particles.

32. The process according to claim 31, wherein a reaction space containing the polymer is subjected to a reduced pressure prior to the sulphonation.

33. The process according to claim 32, wherein said reaction space is subjected to a pressure of less than 10000 Pa.

34. The process according to claim 33, wherein said reaction space is subjected to a pressure of less than 1000 Pa.

35. The process according to claim 34, wherein said reaction space is subjected to a pressure of between 50 and 100 Pa.

36. The process according to claim 31, wherein said polymer to be sulphonated is a cross-linked alkenylaromatic polymer.

37. The process according to claim 36, wherein said polymer has a styrene skeleton.

38. The process according to claim 36, wherein the cross-linking agent is an alkenylaromatic or aliphatic cross-linking agent.

39. The process according to claim 38, wherein said alkenylaromatic or aliphatic cross-linking agent is divinylbenzene, isoprene, allyl methacrylate, vinyl methacrylate, glycol dimethacrylate or glycol diacrylate.

40. The process according to claim 36, wherein said polymer to be sulphonated is a gel-type polymer.

41. The process according to any one of claim 31, wherein said polymer to be sulphonated is a styrene-divinylbenzene copolymer.

42. The process according to claim 40, wherein the cross-linking degree of the polymer is between 0.5 and 12% DVB.

43. The process according to claim 42, wherein the cross-linking degree of the polymer is between 1 and 10% DVB.

44. The process according to claim 41, wherein the cross-linking degree of the polymer is between 0.5 and 12% DVB.

45. The process according to claim 44, wherein the cross-linking degree of the polymer is between 1 and 10% DVB.

46. The process according to claim 31, wherein said polymer to be sulphonated is a macroporous polymer.

47. The process according to claim 46, wherein the cross-linking degree of the polymer is between 4 and 30% DVB.

48. The process according to claim 47, wherein the cross-linking degree of the polymer is between 8 and 20% DVB.

49. The process according to claim 31, wherein said polymer is sulphonated at a temperature of 20 to 120° C.

50. The process according to claim 49, wherein said polymer is sulphonated at a temperature of 40 to 80° C.

51. The process according to claim 31, wherein said polymer is sulphonated to a sulphonation degree of between 0.1 and 5.5 meq/g.

52. The process according to claim 51, wherein said polymer is sulphonated to a sulphonation degree of between 0.2 and 5.5 meq/g.

53. The process according to claim 52, wherein said polymer is sulphonated to a sulphonation degree of between 0.2 and 4.2 meq/g.

54. The process according to claim 53, wherein said polymer is sulphonated to a sulphonation degree of between 1 and 3 meq/g.

55. The process according to claim 31, wherein said polymer to be sulphonated is in a spherical form.

56. The process according to claim 31, wherein the particle size distribution of the polymer to be sulphonated is between 1 and 1.7, indicated in UC units.

57. The process according to claim 56, wherein the particle size distribution of the polymer to be sulphonated is between 1 and 1.25, indicated in UC units.

58. The process according to claim 31, wherein the resin is in a pulverized form.

59. The process according to claim 31, wherein said polymer resin is an ion-exchange resin.

60. The process according to claim 59, wherein said ion-exchange resin is a strongly acidic cation-exchange resin.

* * * * *